United States Patent [19]
Fender et al.

[11] 3,937,421
[45] Feb. 10, 1976

[54] ASYNCHRONOUS HIGH-SPEED PNEUMATIC FILM TRANSPORT MECHANISM

[75] Inventors: William D. Fender, Pasadena; Gordon Sohl, Arcadia, both of Calif.

[73] Assignee: Xerox Corporation, Stamford, Conn.

[22] Filed: Dec. 1, 1971

[21] Appl. No.: 203,615

[52] U.S. Cl. .............................. 242/182; 242/208
[51] Int. Cl.² ................... G11B 15/58; G11B 23/12
[58] Field of Search ........... 242/182, 183, 184, 185, 242/189, 190, 75.51, 208

[56] References Cited
UNITED STATES PATENTS

| | | | |
|---|---|---|---|
| 2,814,676 | 11/1957 | House | 242/190 |
| 2,877,012 | 3/1959 | Angel et al. | 242/183 |
| 2,952,010 | 9/1960 | Demer et al. | 242/185 X |
| 3,016,207 | 1/1962 | Comstock | 242/183 |
| 3,276,707 | 10/1966 | Hurvitz | 242/182 |
| 3,329,364 | 7/1967 | Brettell | 242/182 |

*Primary Examiner*—Leonard D. Christian
*Attorney, Agent, or Firm*—John E. Beck; Terry J. Anderson; Irving Keschner

[57] ABSTRACT

Asynchronous high-speed film transport apparatus wherein supply and take-up reels have opposite ends of an elongated film wound thereupon. A pair of drive motors one for each reel is selectively operable to rotate the reels respectively to move film along a path from one reel to the other. First and second film vacuum chambers are associated respectively with the supply and take-up reels, each chamber being arranged to hold a loop of film, the chambers being positioned adjacent the film path between the reels. Means are connected to the drive motors for producing movement of the film and sensing means are provided for maintaining a predetermined loop of film in each of the chambers during film movement. Between the first vacuum chamber and a read/record station is a first clamp for the film and a storage device for controlling the film advance, the storage device including a movable member for controlling the length of a frame. A second film clamp is positioned opposite the read/record station. Before frame advance, the second film clamp is closed and the first clamp is opened. Film is then pulled from the film loop formed in the supply reel vacuum chamber by applying air pressure and/or vacuum to the film in the storage device. At the same time, the movable member in the storage device, or film advance cavity, is positioned to provide the desired film advance distance. During film advance, the first clamp is closed and the second clamp is opened. Film is then pulled from the film advance cavity into the take-up free film loop by vacuum in the take-up film loop cavity and/or applied pressure.

6 Claims, 2 Drawing Figures

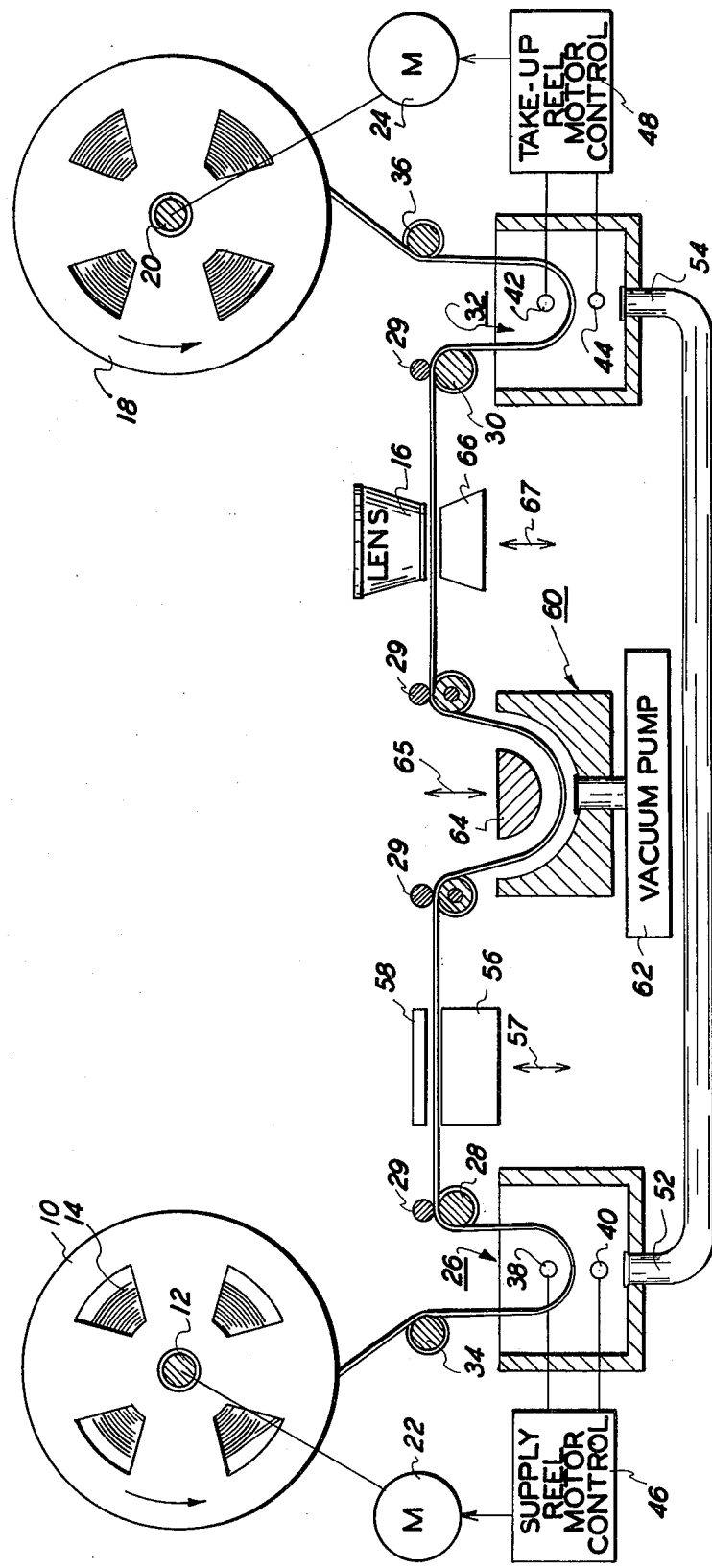
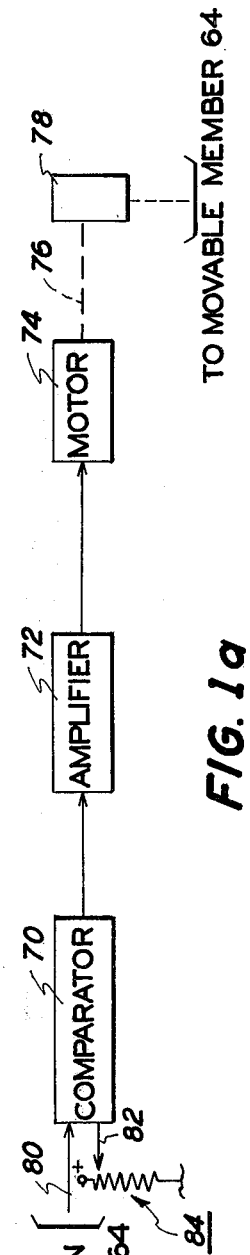
FIG. 1
FIG. 1a
INVENTORS,
WILLIAM D. FENDER
GORDON SOHL
BY Irving Keschner
ATTORNEY

ASYNCHRONOUS HIGH-SPEED PNEUMATIC FILM TRANSPORT MECHANISM

BACKGROUND OF THE INVENTION

In accordance with the desire to be able to drive magnetic tape or film at high speeds both in the forward and reverse directions, the prior art has designed machines which are capable of feeding record film through a read/write station at very high speeds with the ability to reverse direction of the film feed in very short periods of time, all without imposing any excessive stresses on the film. In general, these machines have the film wound around rotating capstans used to draw the film from vacuum columns and feed it past the read/write station. A position sensor is placed in each vacuum column which is responsive to the position of the respective film loop for maintaining a relatively stable position of its film loop within the column. These film loop sensing means are generally spaced at predetermined maximum and minimum positions. Thus, as the capstan withdraws film from one vacuum column and the total length of the film stored therein is reduced to the predetermined minimum, control means associated with the film loop sensitive means initiates rotation of the related reel at some acceleration rate to feed film into the vacuum column. As soon as the film exceeds the predetermined maximum length, the loop sensitive means located at this predetermined maximum position instructs the associated control means to brake the reel to a stop. During this time, the film leaving the drive capstan is directed past the read/record station and into the other vacuum column. When the film therein reaches a predetermined maximum length, its associated film loop sensing means instructs the associated control means to initiate rotation of its related reel to remove the excess film from the vacuum column by winding it onto the take-up reel. Likewise, if the film loop length is reduced to the predetermined minimum, associated control means brakes the take-up reel to terminate the winding operation.

When sudden reversals of the direction of film travel are required, such when the machine is required to switch from a forward drive to a rewind operation, the vacuum loops yield or take-up film practically instantaneously since the inertia of the film in the path from vacuum loop to vacuum loop over the read/record station is extremely low. After the initial very short interval of time, tension is restored to the film and the supply and take-up reels both return to normal operation.

Although the machines described hereinabove perform well when the film or tape is driven at continuous high speeds, a problem still remains when it is desired to have, in addition to the continuous features described hereinabove, a non-continuous or intermittently driven system having a variable film advance control. For example, in the computer output microfilm (COM) systems utilizing electron beam recording (EBR), characters are written directly onto unexposed film. As set forth hereinabove, the unexposed film is drawn into the vacuum chamber and a page, or frame, is written one character at a time onto the film. After the information is written by the electron beam, the film is incremented and the next page written. When viewed by a microfilm reader, the information on each frame appears exactly as it would on a regular printed page.

Typically, the standard output format from a computer is 132 characters per line and 64 lines per page. However, applications exist where more than 132 characters per line and 64 lines per page would be desirable. Although some COM systems provide this capability, the techniques generally involve complex mechanical and/or electronic components and the added cost of this feature as a COM system option generally makes the option unattractive.

SUMMARY OF THE PRESENT INVENTION

The present invention provides asynchronous high-speed pneumatic film transport apparatus which includes supply and take-up reels about which opposite ends respectively of an elongated film may be wound, a pair of drive motors one for each reel selectively operable to rotate the reels respectively to move film along a path from one reel to the other, first and second film vacuum chambers associated respectively with said supply and take-up reels, each chamber arranged to hold a loop of film, the chambers being positioned adjacent the film path between the reels, means connected to the drive motors for producing movement of the film and including means for maintaining a predetermined loop of film in each of the chambers during film movement. Between the first vacuum chamber and a read/record station is a first clamp for the film and a storage device for controlling the film advance, the storage device including a movable member for controlling the length of a frame. A second film clamp is positioned opposite the read/record station. Before frame advance, the second film clamp is closed and the first clamp is opened. Film is then pulled from the film loop formed in the vacuum chamber by applying air pressure and/or vacuum to the film in the storage device. At 81 same time, the movable member in the storage device, or film advance distance. the desired film advance distance. During film advance, the first clamp is closed and the second clamp is opened. Film is then pulled from the film advance cavity into the take-up free film loop by vacuum in the take-up vacuum chamber and/or applied positive pressure.

The film storage loops constantly readjust their length automatically and independently of the film advance procedure set forth hereinabove. The apparatus is therefore capable of operating completely asynchronously at very high cycling rates with extremely short film advance times.

It is an object of the present invention to provide an improved asynchronous high-speed pneumatic film transport apparatus.

It is a further object of the present invention to provide asynchronous high-speed pneumatic film transport apparatus which includes means for controlling the film advance distance.

It is still a further object of the present invention to provide asynchronous high-speed pneumatic film transport apparatus which is reliable, economical, allows rapid reversal in the direction of film movement and enables film advance to be automatically controlled.

DESCRIPTION OF THE DRAWINGS

For a better understanding of the invention as well as other objects and features thereof reference is made to the following description which is to be read in conjunction with the accompanying drawings wherein:

FIG. 1 is a front elevational view, with parts in section, of an asynchronous pneumatic film transport apparatus embodying the present invention; and FIG. 1(a) is a block diagram of apparatus for controlling the distance of film advance.

DESCRIPTION OF THE PREFERRED EMBODIMENT

Referring now to FIG. 1, the film supply reel 10 is mounted on drive spindle 12 and has thereon a coil of unexposed, unsprocketed microfilm 14. In the forward direction film 14 passes through an exposure station which includes a lens 16 and is wound on take-up reel 18 which is mounted on a drive spindle 20. The supply reel spindle 12 and take-up reel spindle 20 are driven by motors 22 and 24 respectively in either direction, said motors being generally of the servo type. Upon selecting the direction of rotation of these motors, the spindles on the associated reels coupled thereto may be caused to reel or unreel film from the coil thereon.

Film from reel 10 is driven into vacuum column 26 and then to read/record station 16 by rotating drive capstans 28 and 30. The vacuum provides the necessary suction to keep the film in contact with the capstans and pinch rollers, or idlers 29, maintain the film taut between sections of the film transport apparatus. Each of the vacuum drive capstans 28 and 30 is capable of rotating in either of two directions in response to the manner in which a motor is connected to it by an electromagnetic clutch which is not shown. A pair of film loops are shown disposed in each of the vacuum columns 26 and 32. As film 14 leaves reel 10, it passes over guide idler 34, down into vacuum column 26, up around drive capstan 28 past stop means (described hereinafter) down around drive capstan 30 into vacuum column 32 and up over guide idler 36 to take-up reel 18.

Vacuum chambers 26 and 32 include sensors 38 and 40 and 42 and 44, respectively. The sensors sense the position of the film loop ends in their associated chamber. Control circuits 46 and 48 are responsive to the outputs of their associated sensors.

When the film loop end rises above an upper sensor 38 or 42 in chambers 26 and 32, respectively, the associated control circuit causes the reel associated with the chamber to rotate in a direction to feed film into the chamber. When the film loop drops below a lower sensor 40 or 44, the associated control circuit causes the reel associated with the chamber to rotate in a direction to withdraw film from the chamber. When the loop end is between a pair of sensors, the associated reel is electrodynamically braked by means not shown.

The details of the supply reel and take-up reel motor control circuits, the associated rewind circuits etc. have not been shown since means to accomplish these functions are well known in the prior art and do not form part of the present invention.

A vacuum pump 50 supplies an appropriate vacuum to chambers 26 and 32 via conduits 52 and 54, respectively.

The present invention is directed to the elements shown between rotating drive capstans 28 and 30. A film clamp 56 and its associated platen 58 serves to clamp the film 14 at predetermined times in the film travel as will be described hereinafter. Storage chamber, or cavity, 60 which stores the film during its advance, is shown with associated vacuum pump 62 for providing a vacuum in the storage chamber. A movable member 64, such as a shoe, is moved in the direction shown by arrows 65 in chamber 60 in response to appropriate control signals as will be described hereinafter. The film 14, after exiting chamber 60 passes through read/record station, shown in the figure as a lens, to drive capstan 30. A film clamp 66 travels in the direction indicated by arrow 67 in response to appropriate control signals.

The asynchronous pneumatic film transport apparatus of the present invention operates in the following manner:

As set forth hereinabove, the supply free storage loop in chamber 26 is maintained by vacuum sensors 38 and 40 located in the side of the chamber. Signals from the vacuum sensors drive the film supply spool torquer motor 22 via motor control means 46 which unwinds unexposed film 14 which is drawn into the supply free storage chamber by vacuum. The position of the film in chamber 32 controls the take-up reel torquer motor 24 and operates in a similar manner.

Before frame advance, film clamp 66 is closed and clamp 56 is opened. Film 14 is then pulled from the loop in vacuum chamber 26 by applying air pressure and/or vacuum to the film stored in storage chamber 60. At the same time, movable member 64 in storage chamber 60 is positioned to provide the desired film advance distance. During film advance, clamp 56 is closed and clamp 66 is opened. Film 14 is then pulled from the storage chamber 60 into the chamber 32 by vacuum therein.

The film storage loops in chambers 26 and 32 constantly readjust their lengths automatically and independently of the above-described film advance procedure. The system described hereinabove is therefore able to operate completely asynchronously at very high cycling rates with extremely short film advance times.

Film clamps 56 and 66 are forced to move in the direction of arrows 57 and 67, respectively, by the operation of solenoids, not shown in the drawing. The operation of the solenoids whereby film clamps are alternately operated before and after film advance may be done manually or automatically. The movable member 64 is controlled as follows. Referring to FIG. 1(a), a comparator circuit 70 is coupled to the input of an amplifier 72, the output thereof driving servo motor 74. The output shaft 76 of servo motor 74 is coupled to a mechanical device 78, such as a rack and pinion, the rack formed on the movable member 64, which converts the rotary motions of shaft 76 into a linear motion. The output of device 78 is coupled to member 64. The position of member 64 is electrically sensed as the signal is coupled to one input of comparator circuit 70 via lead 80. The other input to the comparator circuit 70 on lead 82 corresponds to the desired film advance distance, calibrated relative to the position of member 64. The desired film advance is determined and the tap on potentiometer 84 is set to correspond to this value. By virtue of the operation of the feedback arrangement shown in FIG. 1(a), member 64 is moved in the direction of arrow 65 until it is positioned to the desired value. Other techniques may be utilized to position member 64 including a manual micrometer adjustment, a pneumatic servo system, etc.

The variable film advance distance is determined by the position of member 64 since the film 14 is forced by vacuum to follow the contour of member 64 between the bottom of chamber 60 and the bottom of member 64.

In the situation, wherein film 14 is to be utilized in a COM system, a CRT being used as the recording member, lens 16 passes the image on the face of the CRT onto unexposed film 14. The invention, as described hereinabove, provides a relatively simple and inexpensive technique for adjusting the film frame to correspond to the CRT output.

If the film 14 has recorded information thereon, the present system may also be utilized to view this information. In this case, appropriate projection devices are positioned at station 16 and read via a standard microfilm reader, the reader, if so desired, having the capability of providing a hard copy of the viewed information. It should be noted that a magnetic tape, video tape, etc., may be utilized in lieu of film 14.

In summary, the present invention provides for high speed advances of unsprocketed film in an asynchronous manner utilizing a pneumatic-advance, pneumatic feed technique with film advance automatically controlled.

While the invention has been described with reference to its preferred embodiment, it will be understood by those skilled in the art that various changes may be made and equivalent substitutes for elements thereof without departing from the true spirit and scope of the invention. In addition, many modifications may be made to adapt a particular situation or material to the teachings of the invention without departing from its essential teachings.

What is claimed is:

1. In an asynchronous high-speed film transport apparatus which includes supply and take-up reels about which opposite ends respectively of an elgonated film may be wound, a pair of drive motors one for each reel selectively operable to rotate the reels respectively to move film along a path from one reel to the other, a read/record station being positioned between said first and second reels, first and second film vacuum chambers associated respectively with said first and second reels, each chamber arranged to hold a loop of film, the chambers being positioned adjacent the film path between the reels, means connected to the drive motors for producing movement of the film and means for maintaining a predetermined loop of film in each of the chambers during film movement, the improvement comprising:

means for providing variable-width frames of film for predetermined film advance positioned between said first and second vacuum chambers along the film transport path, first film clamp means located between the first vacuum chamber and said frame providing means, second film clamp means positioned at the opposite side of said frame providing means, said first and second clamp means and said frame providing means being operated in a manner such that successive frame-by-frame movement of said film is provided relative to said read/record station, said frame providing means includes a movable member which is positioned adjacent one surface of the film to vary the amount of film in said frame providing means in response to a signal which corresponds to a desired amount of film advance, and further includes means for applying a substantially uniform pressure on the other surface of the film in said frame providing means and said pressure-applying means cooperates with said movable member to define each predetermined frame width for film advance.

2. The apparatus as defined in claim 1 wherein said film is microfilm.

3. The apparatus as defined in claim 1 wherein said pressure-applying means is a vacuum acting on the surface of said film opposite said movable member.

4. In an asynchronous high-speed film transport apparatus which includes supply and take-up reels about which opposite ends respectively of an elongated film may be wound, a pair of drive motors, one for each reel selectively operable to rotate the reels respectively to move film along a path from one reel to the other, a read/record station being positioned between said first and second reels, first and second film vacuum chambers associated respectively with said first and second reels, each chamber arranged to hold a loop of film, the chambers being positioned adjacent the film path between the reels, means connected to the drive motors for producing movement of the film and means for maintaining a predetermined loop of film in each of the chambers during film movement, the improvement comprising:

a film storage chamber positioned between said first and second vacuum chambers along the silm transport path for providing predetermined frames of film, first film clamp means located between the first vacuum chamber and said storage chamber, second film clamp means positioned at the opposite side of said storage chamber, said first and second clamp means and said storage means cooperating in a manner such that successive frame-by-frame movement of said film is provided relative to said read/record station, and means included in said storage chamber for providing variable frame widths for film advance, said means for providing variable frame widths comprises a movable member which is positioned adjacent one surface of the film to vary the amount of film in said chamber in response to a signal which corresponds to a desired amount of film advance, and further includes means for applying a substantially uniform pressure on the other surface of the film in said chamber and said pressure-applying means cooperates with said movable member to define each predetermined frame width for film advance.

5. The apparatus as defined in claim 4 wherein said pressure-applying means is a vacuum acting on the surface of said film opposite said movable member.

6. A method of transporting film asynchronously in a high-speed film transport apparatus which includes supply and take-up reels about which opposite ends respectively of an elongated film may be wound, a pair of drive motors, one for each reel selectively operable to rotate the reels respectively to move film along the path from one reel to the other, a read/record station being positioned between said first and second reels, first and second film vacuum chambers associated respectively with said first and second reels, each chamber arranged to hold a loop of film, the chambers being positioned adjacent the film path between the reels, means connected to the drive motors for producing movement of the film and means for maintaining a predetermined loop of film in each of the chambers during film movement, comprising the steps of:

providing a storage chamber positioned between said first and second vacuum chambers along the film transport path, said chamber including a movable member which is positioned to vary the amount of film in said chamber in response to a signal which corresponds to a desired amount of film advance such that variable frame widths of film are defined, clamping the film at the egress side of said chamber prior to film advance, positioning said movable member in relation to one surface of the portion of film in said chamber for a predetermined amount of film advance, applying a substantially uniform pressure in relation to the opposite surface of the portion of the film in said chamber to cooperate with the position of said movable member such that variable frame widths of film may be selected for film advance, and unclamping the film at the egress side of said chamber and clamping the film at the entry side of said chamber for film advance.

* * * * *

UNITED STATES PATENT AND TRADEMARK OFFICE
CERTIFICATE OF CORRECTION

PATENT NO. : 3,937,421
DATED : February 10, 1976
INVENTOR(S) : William D. Fender, Gordon Sohl It is certified that error appears in the above-identified patent and that said Letters Patent are hereby corrected as shown below:

In Column 2, lines 38-40, change "At 81 same time, the movable member in the storage device, or film advance distance. the desired film advance distance." to --At the same time, the movable member in the storage device, or film advance cavity, is positioned to provide the desired film advance distance.--.

Signed and Sealed this

Thirtieth Day of November 1976

[SEAL]

Attest:

RUTH C. MASON
*Attesting Officer*

C. MARSHALL DANN
*Commissioner of Patents and Trademarks*